US012152515B2

(12) United States Patent
Redfern et al.

(10) Patent No.: US 12,152,515 B2
(45) Date of Patent: Nov. 26, 2024

(54) ENGINE BRAKING SYSTEM

(71) Applicant: DEERE & COMPANY, Moline, IL (US)

(72) Inventors: Kyle D. Redfern, Cedar Falls, IA (US); Neil S. Erickson, Denver, IA (US); Gregory J. Horton, Cedar Falls, IA (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 17/569,298

(22) Filed: Jan. 5, 2022

(65) Prior Publication Data

US 2023/0212965 A1 Jul. 6, 2023

(51) Int. Cl.

| | |
|---|---|
| ***F01L 13/06*** | (2006.01) |
| ***F01L 1/047*** | (2006.01) |
| ***F01L 1/053*** | (2006.01) |
| ***F01L 1/18*** | (2006.01) |
| ***F01L 1/24*** | (2006.01) |
| ***F01L 1/26*** | (2006.01) |
| ***F01L 13/00*** | (2006.01) |
| ***F02D 13/04*** | (2006.01) |

(52) U.S. Cl.

CPC ............... *F01L 13/06* (2013.01); *F01L 1/047* (2013.01); *F01L 1/053* (2013.01); *F01L 1/181* (2013.01); *F01L 1/24* (2013.01); *F01L 1/26* (2013.01); *F01L 13/0026* (2013.01); *F01L 13/065* (2013.01); *F02D 13/04* (2013.01); *F01L 2001/188* (2013.01); *F01L 2305/00* (2020.05)

(58) Field of Classification Search

None

See application file for complete search history.

(56) References Cited

U.S. PATENT DOCUMENTS 3,220,392 A * 11/1965 Cummins ............. F01L 13/065 180/335
3,367,312 A * 2/1968 Jonsson .................. F01L 13/06 123/378
6,257,190 B1 7/2001 Linebarger
(Continued)

FOREIGN PATENT DOCUMENTS

CH 663643 A5 * 12/1987 ................ F01L 1/12
WO WO-2011075008 A1 * 6/2011 .............. F01L 1/182
WO WO-2017116917 A1 * 7/2017 ................ F01L 1/08

OTHER PUBLICATIONS

CH-663643-A5, English Language Machine Translation (Year: 1987).*
(Continued)

*Primary Examiner* — Wesley G Harris

(74) *Attorney, Agent, or Firm* — Michael Best & Friedrich LLP

(57) ABSTRACT

An engine braking system includes a camshaft, a follower, an exhaust armature, a lever, and a hydraulically actuated piston. The camshaft includes at least one cam. The cam has a lobe and a brake bump. The follower engages the cam. The exhaust armature is coupled to the follower. The lever is coupled to the exhaust armature. The hydraulically actuated piston moves the lever. Hydraulic actuation of the piston causes a change in lash distance between the cam and the follower. In an engine brake mode, the follower contacts the cam throughout rotation of the cam.

18 Claims, 9 Drawing Sheets

(56) References Cited

U.S. PATENT DOCUMENTS

| | | | | |
|---|---|---|---|---|
| 6,694,933 | B1 * | 2/2004 | Lester | F01L 13/0031<br>123/90.11 |
| 2003/0188703 | A1 * | 10/2003 | Vanderpoel | F01L 9/11<br>123/90.15 |
| 2010/0108007 | A1 * | 5/2010 | Meistrick | F01L 13/065<br>123/90.46 |
| 2010/0170472 | A1 * | 7/2010 | Yang | F01L 1/181<br>123/321 |
| 2013/0042835 | A1 | 2/2013 | Hansson et al. | |
| 2019/0078474 | A1 | 3/2019 | Lee | |

OTHER PUBLICATIONS

Extended European Search Report and Written Opinion issued in European Patent Application No. 22197969.3, dated May 31, 2023, in 07 pages.

* cited by examiner

ENGINE BRAKING SYSTEM

FIELD

Embodiments described herein relate to systems and methods for operation of an engine braking system. More particularly, the embodiments described herein relate to a system and method for engine braking of a work vehicle.

SUMMARY

The present disclosure includes an engine braking system. The engine braking system includes a camshaft, a follower, an exhaust armature, a lever, and a hydraulically actuated piston. The camshaft includes at least one cam. The cam has a lobe and a brake bump. The follower engages the cam. The exhaust armature is coupled to the follower. The lever is coupled to the exhaust armature. The hydraulically actuated piston moves the lever. Hydraulic actuation of the piston causes a change in lash distance between the cam and the follower. In an engine brake mode, the follower contacts the cam throughout rotation of the cam.

In some embodiments, the follower engages the lobe and does not engage the brake bump in a power mode.

In some embodiments, during at least a portion of the power mode, the lash distance between the cam and the follower is between 2.5 millimeters and 3.5 millimeters.

In some embodiments, during at least a portion of the power mode, the lash distance between the cam and the follower is between 2.8 millimeters and 3.2 millimeters.

In some embodiments, during at least a portion of the engine brake mode, the lash distance between the cam and the follower is 0 millimeters.

In some embodiments, the exhaust armature is rotatably mounted to a shaft with an eccentric bushing disposed radially between the exhaust armature and the shaft.

In some embodiments, the camshaft includes a camshaft axis of rotation, the exhaust armature includes an armature axis of rotation, and hydraulic actuation of the piston causes the armature axis of rotation to change location relative the camshaft axis of rotation.

In some embodiments, a solenoid selectively releases fluid to hydraulically actuate the piston.

In some embodiments, the fluid includes engine oil.

In some embodiments, a controller is operatively coupled with the solenoid. The controller activates the solenoid after detecting whether brake conditions have been met.

In some embodiments, the brake conditions include engine speed being above a threshold value and cylinder fueling having ceased.

In some embodiments, the controller further deactivates the solenoid after detecting the brake conditions are no longer met.

In some embodiments, a spring biases the lever. The hydraulically actuated piston overcomes the spring to move the lever.

The present disclosure includes a method of operating an engine braking system. The method includes receiving a signal to engage the engine braking system, opening a fluid valve in response to the signal, introducing fluid through the valve to hydraulically move the piston, engaging a lever with the piston due to movement of the piston, changing a position of an exhaust armature coupled to the lever due to movement of the lever, reducing a lash distance between a cam and a follower due to movement of the exhaust armature, and contacting the cam with the follower throughout rotation of the cam in an engine brake mode. The follower is coupled to the exhaust armature.

In some embodiments, the method further includes receiving a signal to disengage the engine braking system, releasing the fluid in response to the signal to disengage, biasing the lever with a spring, changing the position of the exhaust armature due to releasing the fluid and biasing from the spring, and increasing the lash distance between the cam and the follower due to movement of the exhaust armature.

In some embodiments, the signal to disengage the engine braking system corresponds with an engine speed falling below a threshold value.

In some embodiments, the method further includes confirming an engine speed is above a threshold value and confirming fueling has stopped prior to opening the fluid valve.

The present disclosure includes an engine braking system. The engine braking system includes a camshaft, a follower, and an exhaust armature. The camshaft includes at least one cam. The cam has a lobe and a brake bump. The follower engages the cam. The exhaust armature is coupled to the follower. The exhaust armature actuates an exhaust valve. In an engine brake mode, the follower sequentially engages the lobe and the brake bump. The automatically reduces a lash distance between the cam and the follower below a threshold value. In a power mode, the follower engages the lobe but not the brake bump. The engine braking system hydraulically switches between the engine brake mode and the power mode.

In some embodiments, a solenoid opens a valve to introduce engine oil to hydraulically switch the engine braking system from the power mode to the engine brake mode.

In some embodiments, a spring switches the engine braking system from the engine brake mode to the power mode after pressure from the engine oil is relieved.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Other aspects of the embodiments will become apparent by consideration of the detailed description and accompanying drawings.

DETAILED DESCRIPTION

Figure 1:
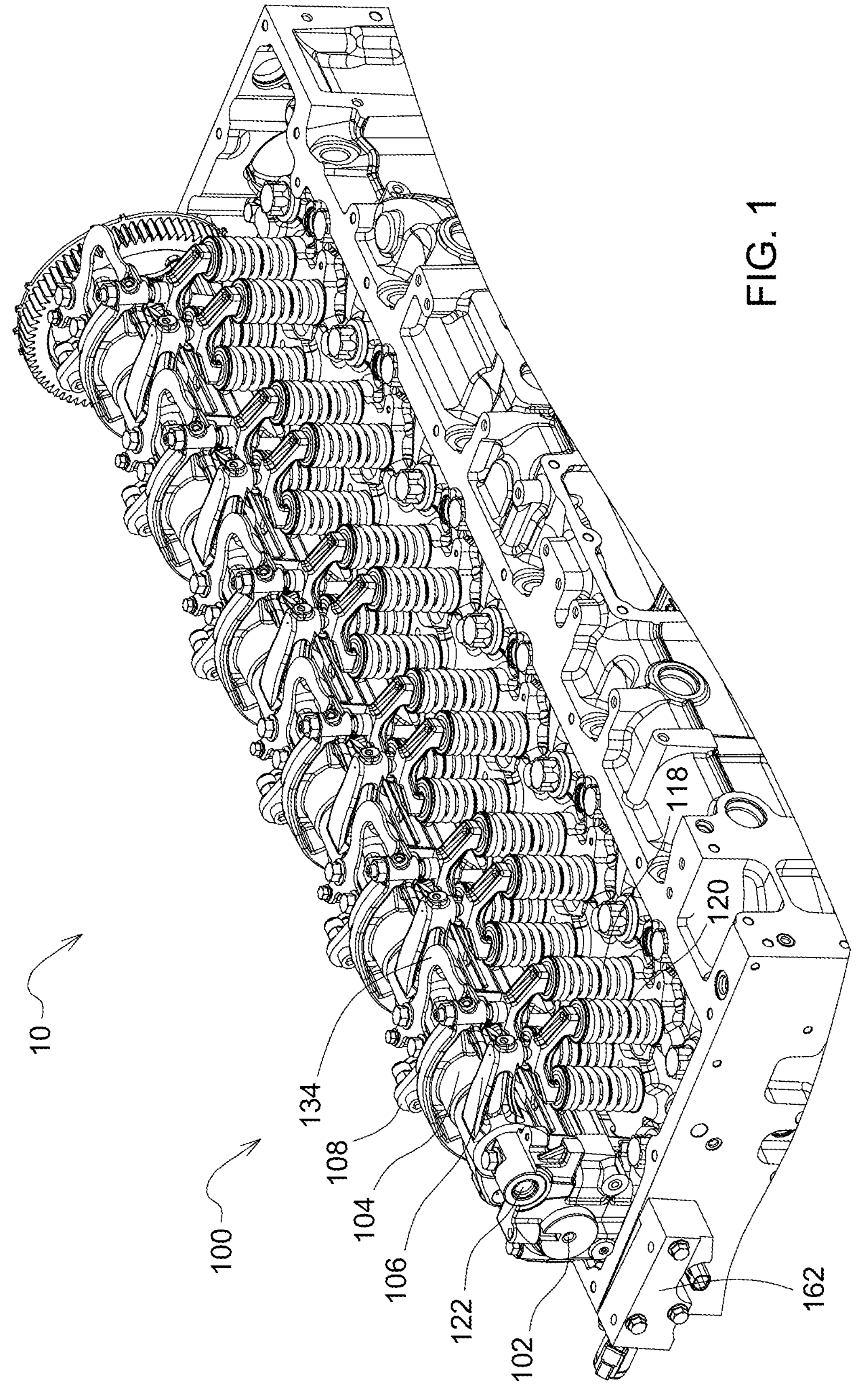
FIG. 1 illustrates a portion of an engine equipped with an engine braking system, according to embodiments described herein.

FIG. 1 illustrates an example embodiment of an engine 10 equipped with an engine braking system 100. The engine braking system 100 includes a camshaft 102, an exhaust armature 104 (adjacent a corresponding intake armature 106), and a lever 108.

Figure 2A:
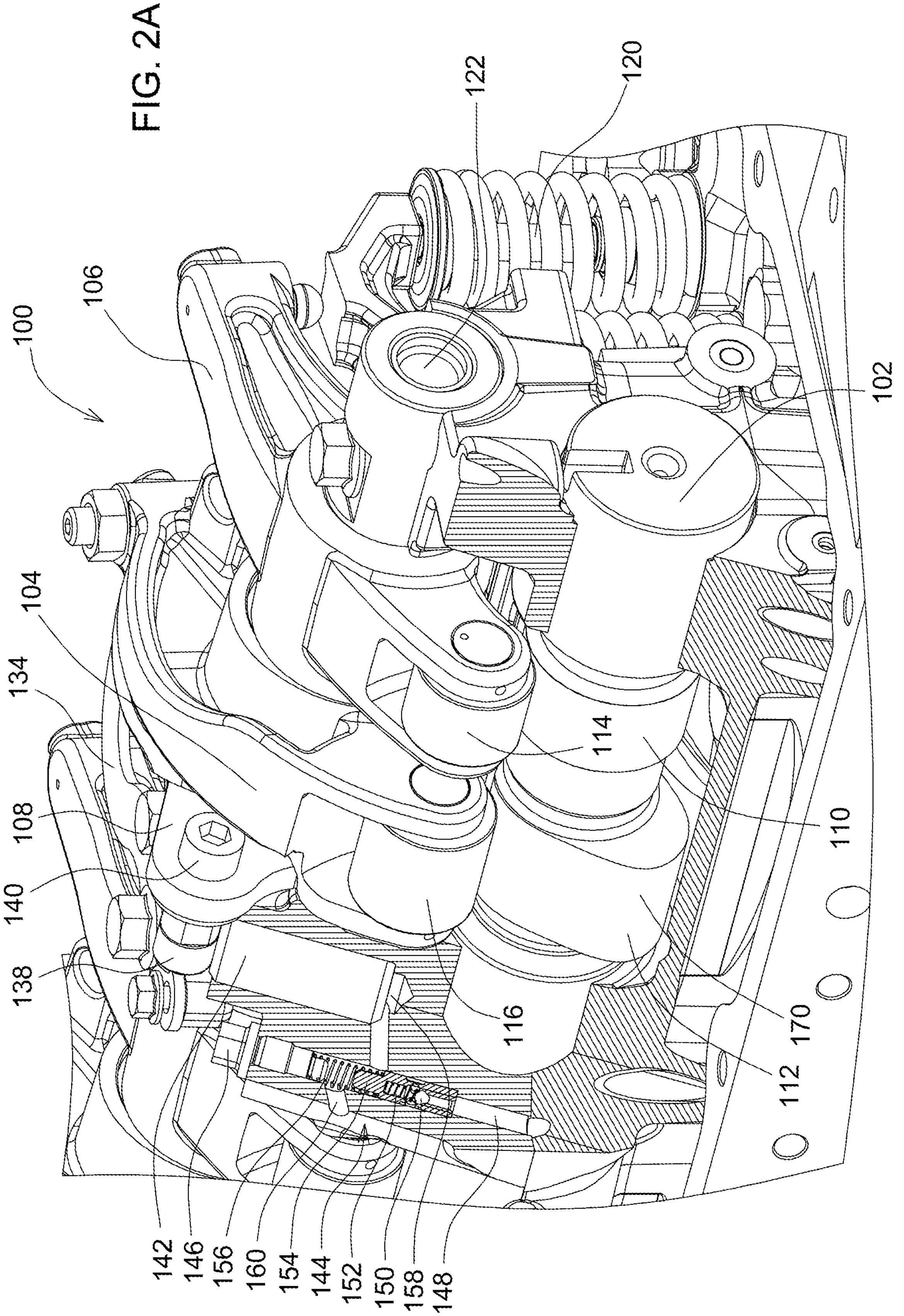
FIG. 2A illustrates a detailed cross-sectional perspective view of a fluid pathway and a piston of the engine braking system of FIG. 1, with the piston in the retracted position.

With reference to FIG. 2A, the camshaft 102 includes a plurality of cams, such as the intake cam 110 and the exhaust cam 112 shown. The intake armature 106 is actuated by engagement of the intake cam 110 with an intake follower 114 that is coupled to the intake armature 106. The exhaust armature 104 is actuated by engagement of the exhaust cam 112 with an exhaust follower 116 that is coupled to the exhaust armature 104. The exhaust armature 104 actuates one or more exhaust valves 118 (best shown in FIG. 6). Returning to FIG. 2A, the intake armature 106 actuates one or more intake valves 120.

Figure 3:
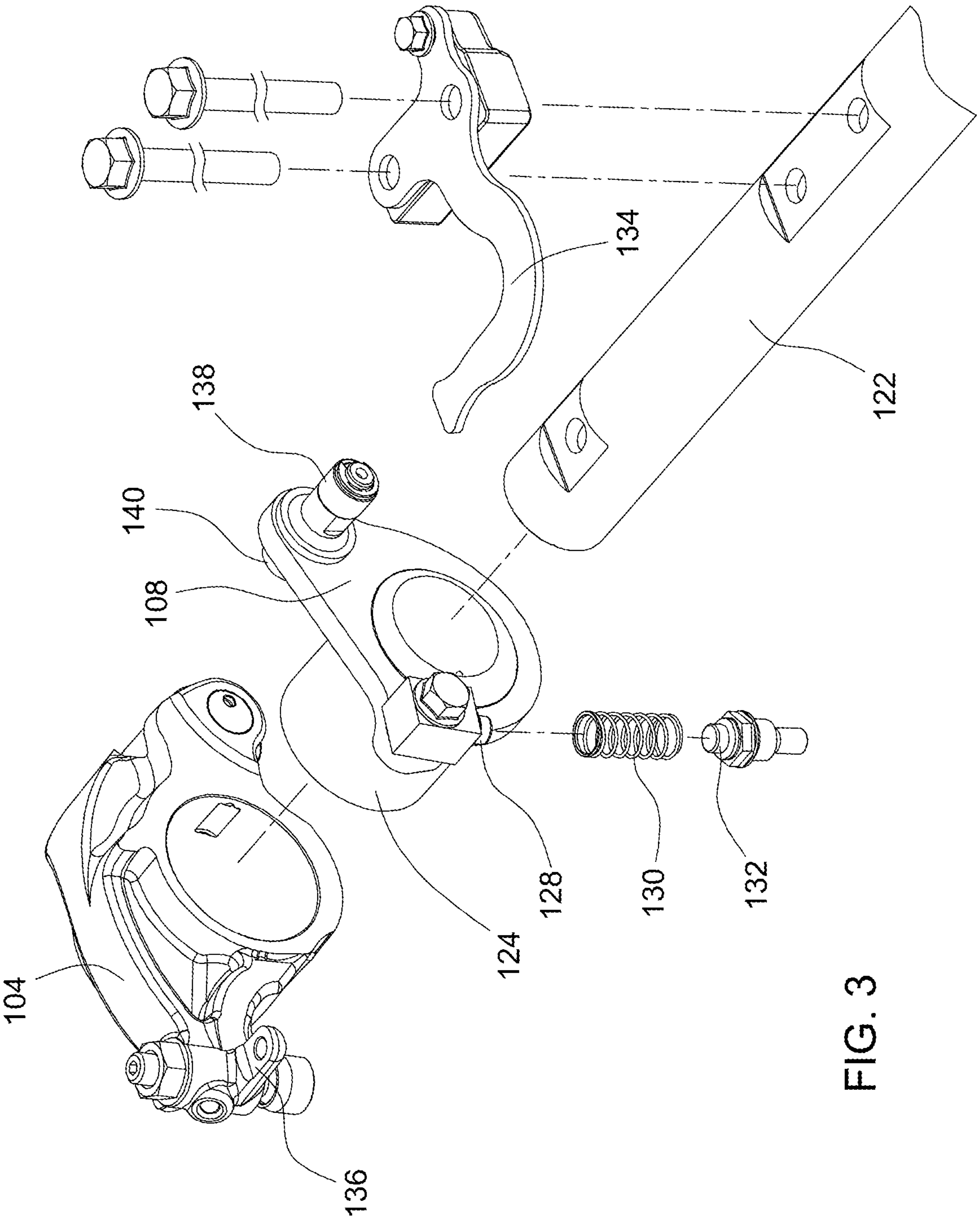
FIG. 3 illustrates an exploded perspective view of an exhaust armature and a lever of the engine braking system of FIG. 1.
Figure 4:
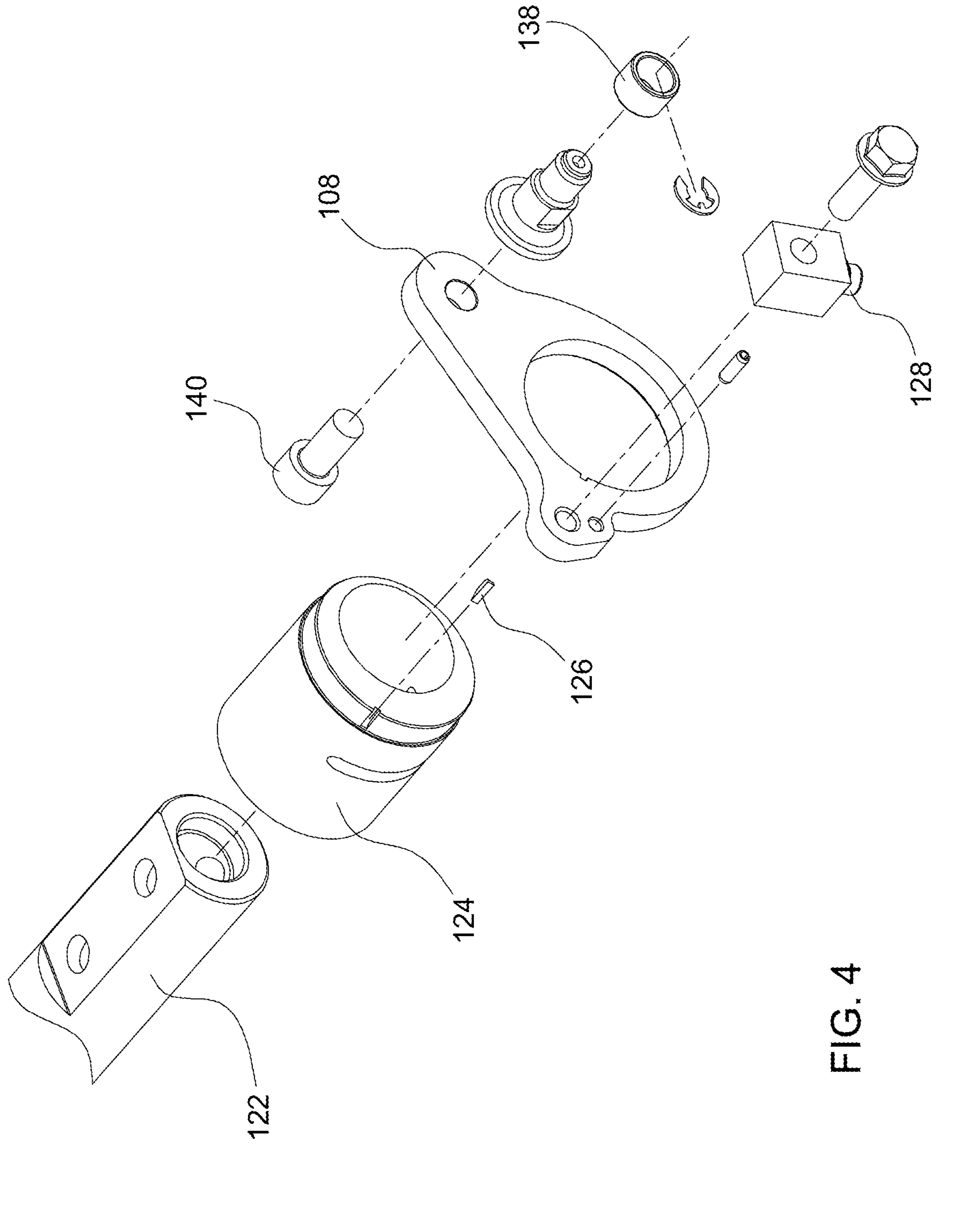
FIG. 4 illustrates an exploded perspective view of the lever of FIG. 3.

Turning now to FIG. 3, the lever 108 is coupled to the exhaust armature 104. Specifically, a mount shaft 122 is statically coupled to other components of the engine 10. An eccentric bushing 124 is rotatably coupled to the mount shaft 122. Both the lever 108 and the exhaust armature 104 are statically coupled to the eccentric bushing 124 with, for instance, a key (the key 126 for the lever 108 is shown in FIG. 4). Because both the lever 108 and the exhaust armature 104 are statically coupled to the eccentric bushing 124, it can be said that the lever 108 and the exhaust armature 104 are coupled to each other.

The lever 108 includes a post 128 that receives a spring 130 thereon to bias the lever 108. The spring 130 may also be received on a stationary post 132 coupled to another component of the engine 10. Because the lever 108 rotates with the eccentric bushing 124, as does the exhaust armature 104, the spring 130 also biases the exhaust armature 104. In the illustrated embodiment, the spring 130 biases the exhaust armature 104 toward a position corresponding with a normal operation, e.g., a power mode, of the engine 10 (shown in FIG. 6 and described in more detail below). The post 128 and the stationary post 132 are not configured to contact each other during normal conditions either in the power mode or in the engine brake mode. Also shown in FIG. 3, a leaf spring 134 may also be statically mounted to and cantilevered from the mount shaft 122. The leaf spring 134 may engage a face 136 of the exhaust armature 104 to prevent the exhaust armature 104 from traveling too far due to forces from, for instance, the spring 130.

The lever 108 further includes a roller 138 in the illustrated embodiment. In other embodiments, though, the lever 108 may simply include a boss or post instead of the roller 138. The roller 138 in the illustrated embodiment is coupled to the lever 108 by a fastener 140, but other embodiments may include a boss or post integrally formed with the lever 108 as a single part or permanently affixed to the lever 108 by, for instance, welding.

Figure 2B:
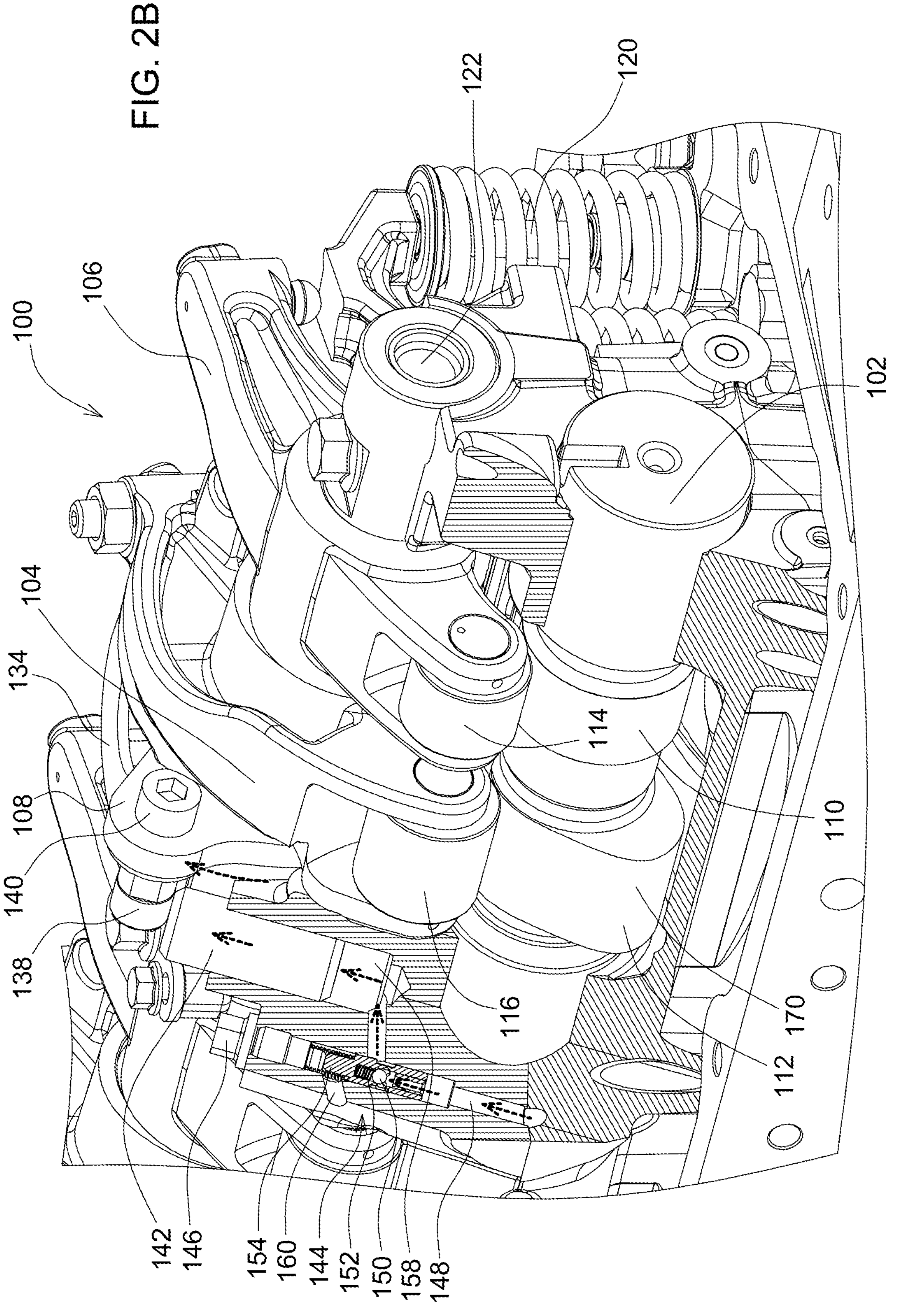
FIG. 2B illustrates the fluid pathway and piston of FIG. 2A, with the piston in the extended position.

Returning to FIG. 2A, the engine braking system 100 further includes a hydraulically actuated piston 142 and a fluid valve assembly 144. A plug 146 is mounted to other components of the engine 10, which allows for installation and/or replacement of the fluid valve assembly 144. Fluid (e.g., engine oil) is introduced through a fluid introduction passage 148, which is partially shown in FIG. 2A and described in more detail below. When the pressure of fluid in the fluid introduction passage 148 is great enough, the fluid moves a ball 150 against an inner spring 152. Then, a valve body 154 of the fluid valve assembly 144 moves (upwardly in FIG. 2B) against an outer spring 156, which is trapped between the valve body 154 and the plug 146 in the illustrated embodiment. Once the valve body 154 has moved beyond a threshold distance, the fluid introduction passage 148 is fluidly communicated with a space 158 behind the hydraulically actuated piston 142. The pressure of the fluid behind the piston 142 eventually becomes great enough to raise the piston 142, which pushes the roller 138 of the lever 108, which pivots the lever 108 against the bias of the spring 130. As explained above, moving the lever 108 also moves the exhaust armature 104 due to both components being keyed to the eccentric bushing 124. Actuation of the piston 142, therefore, switches the engine braking system 100 to the engine brake mode (shown in FIG. 7). The engine braking system 100 is kept in the engine brake mode by maintaining the fluid pressure in the fluid introduction passage 148 above a threshold pressure. Any forces on the piston 142 that might try to return the piston 142 to the position in FIG. 2A would instead move the ball 150, which acts as a one-way valve (or check valve). The fluid behind the piston 142, therefore, does not escape and instead "dead-heads" to keep the piston 142 in place.

Returning now to FIG. 2A, when the pressure of the fluid in the fluid introduction passage 148 is relieved and lowered below a threshold value, the spring 130 overcomes the pressure of the fluid behind the piston 142, thereby moving the piston 142 to a retracted position (back to the position shown in FIG. 2A). More specifically, in the illustrated embodiment, the pressure of the fluid in the fluid introduction passage 148 lowers below a threshold pressure value, and the valve body 154 then moves due to the outer spring 156 overcoming the force of the fluid pressure in the fluid introduction passage 148. Once the valve body 154 moves a sufficient amount (such as to the position in FIG. 2A), the space 158 behind the piston 142 is fluidly communicated with a fluid vent passage 160. This fluid vent passage 160 allows the fluid in the space 158 behind the piston 142 to escape, which allows the piston 142 to move (such as to the position in FIG. 2A). In the illustrated embodiment, the space outside of the fluid vent passage 160 is underneath a valve cover, so venting the fluid outside simply returns the engine oil to the lubrication system of the engine 10.

Figure 5:
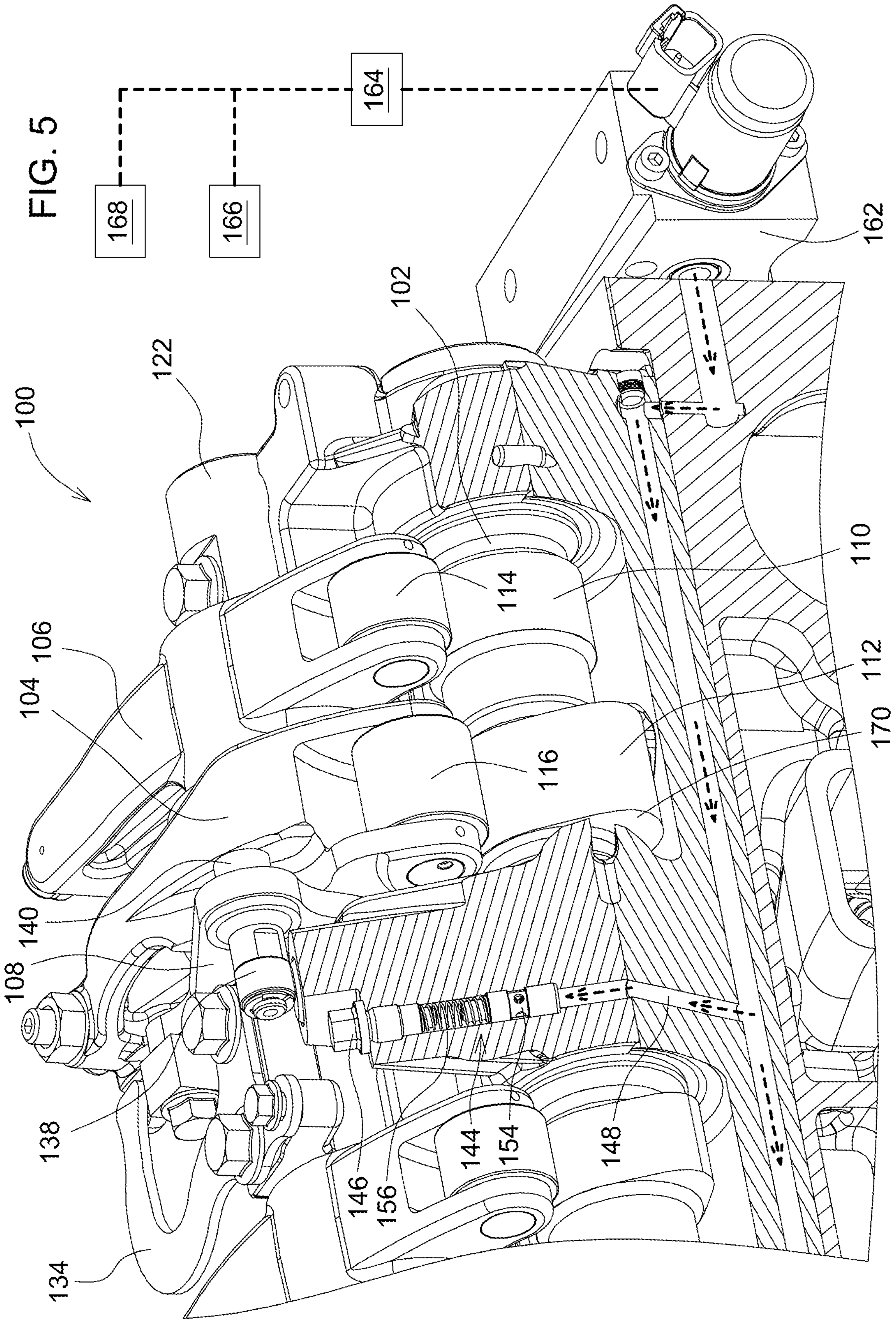
FIG. 5 illustrates a detailed cross-sectional perspective view of the fluid pathway and a solenoid of the engine braking system of FIG. 1.

As shown in FIG. 5, the amount of fluid provided to the fluid introduction passage 148 is governed by the operation of a solenoid 162. The solenoid 162 selectively releases fluid into the fluid introduction passage 148. High-pressure fluid is supplied behind the supply valve operated by the solenoid 162, and the solenoid 162 actuates to open the supply valve, thereby allowing the high-pressure fluid to enter the fluid introduction passage 148. In the illustrated embodiment, the solenoid 162 also actuates a relief valve (not shown) to lower the pressure of the fluid in the fluid introduction passage 148 by releasing fluid therefrom. In some embodiments, the solenoid 162 opens the supply valve and closes the relief valve in one motion. Similarly, the solenoid 162 opens the relief valve and closes the supply valve in one motion. Of course, other embodiments may control these valves separately with, for instance, separate solenoids. In the illustrated embodiment, activation of the solenoid 162 opens the supply valve and closes the relief valve, thereby switching the engine braking system 100 to the engine brake mode (shown in FIGS. 2B and 7). Deactivation of the solenoid 162 closes the supply valve and opens the relief valve, thereby switching the engine braking system 100 to the power mode (shown in FIGS. 2A and 6).

With continued reference to FIG. 5, the solenoid 162 is controlled by a controller 164. The controller 164 is operably coupled to the solenoid 162 by, for instance, one or more wires. The controller 164 monitors conditions of the work vehicle to determine when engine braking is appropriate. In some embodiments, this condition is only based on a control command received from a user operating the work vehicle. In other embodiments, however, the controller 164 may operate more automatically. For instance, in some embodiments, the controller 164 may also be operatively coupled to one or more sensors such as, for instance, an engine speed sensor 166 (e.g., a Hall effect sensor, a reflective sensor, an interrupter sensor, an inductive sensor, a rotary potentiometer, or the like), a fueling sensor 168 (e.g., monitoring signal to electronic fuel injectors to know when the fuel injectors have last activated), and/or other appropriate sensors. In this manner, the controller 164 may be configured to activate the solenoid 162 to supply high-pressure fluid to the fluid introduction passage 148 after detecting whether certain conditions that are conducive to engine braking have been met. These conditions may include, for instance, that the engine speed is above a threshold value and the fueling to the corresponding cylinder has ceased. Similarly, the controller 164 may be configured to deactivate the solenoid 162 to relieve the pressure of the fluid in the fluid introduction passage 148 after detecting one or more of the conditions are no longer met. For instance, if the engine speed falls below a threshold value, the controller 164 may switch the engine braking system 100 back to the power mode from the engine brake mode.

Figure 6:
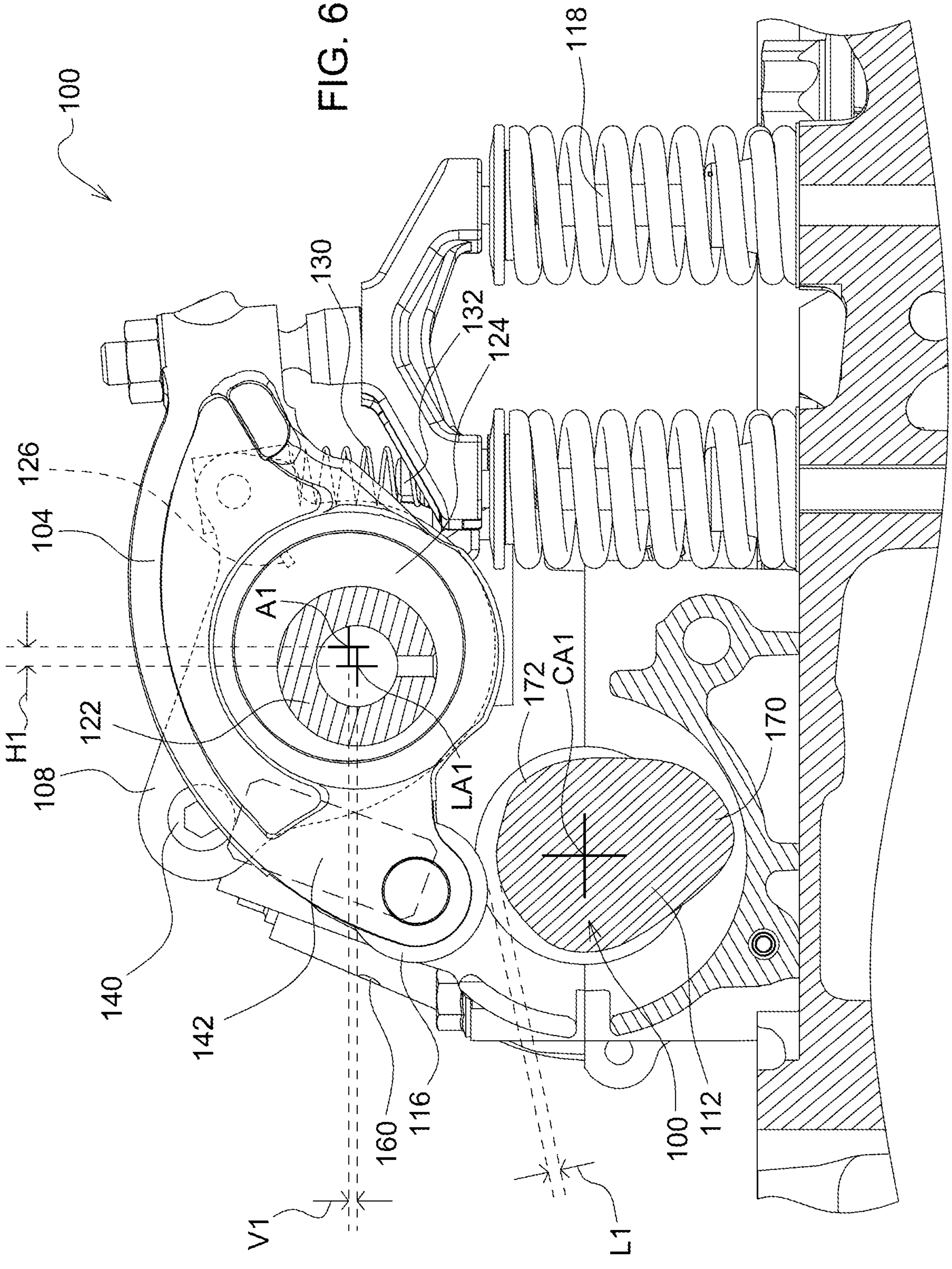
FIG. 6 illustrates a cross-sectional elevation view of the exhaust armature and the cam of the engine braking system of FIG. 1 with a lash spacing between a follower and the cam.
Figure 8:
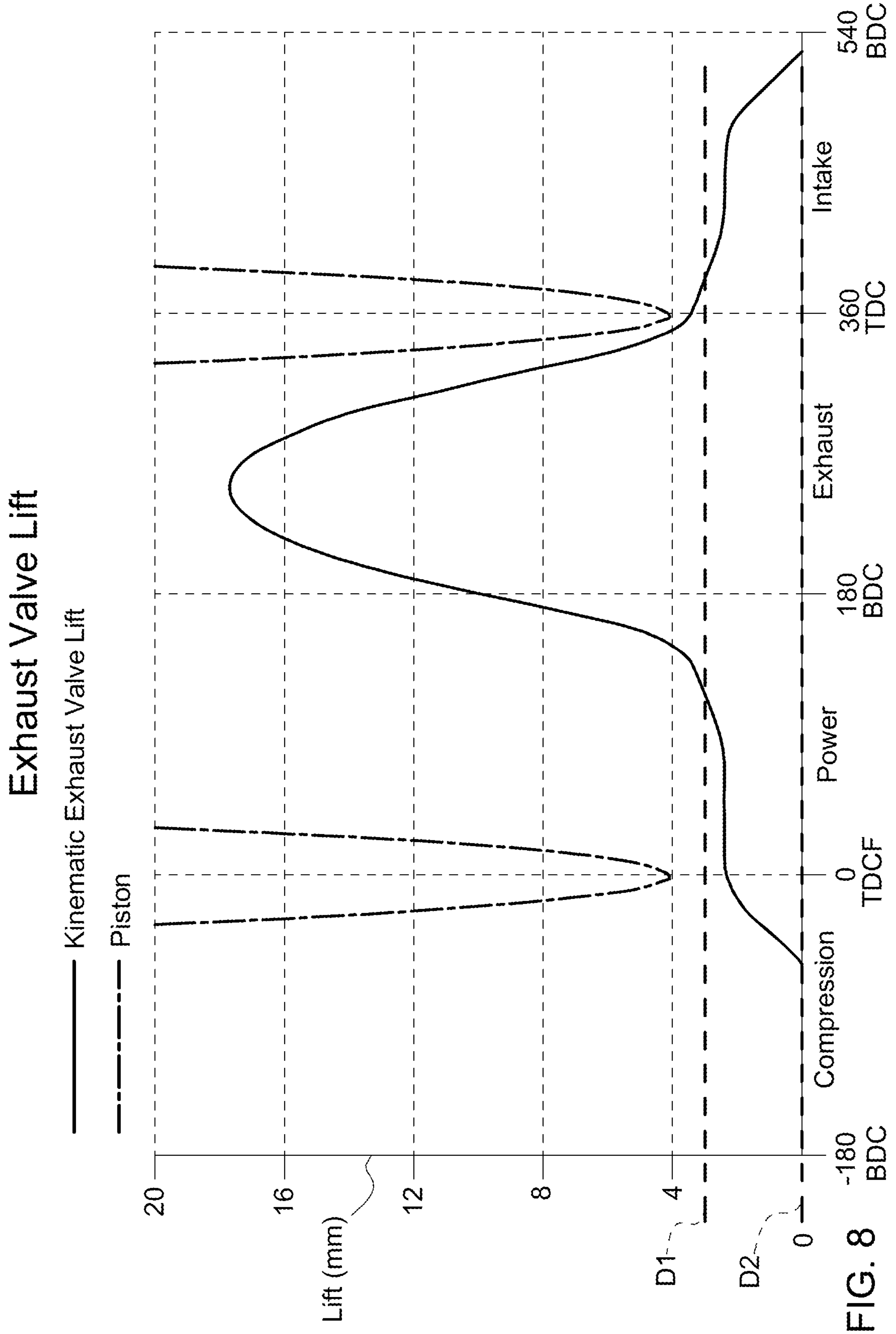
FIG. 8 illustrates a graph of the lift behavior of an exhaust valve of the engine using the engine braking system of FIG. 1.

Turning now to FIG. 6, the components of the engine 10 and engine braking system 100 are shown in the power mode (e.g., normal operation mode). As shown in the figure, the exhaust cam 112 has both a primary lobe 170 and a brake bump 172. In the power mode, the exhaust follower 116 misses the brake bump 172 due to the lash L1 between the exhaust cam 112 and the exhaust follower 116. This behavior is represented by the solid line only above the dashed line D1 in the line graph showing the kinematic exhaust valve lift in FIG. 8. In this power mode, the exhaust follower 116 only engages the primary lobe 170 for the normal operation exhaust event for the corresponding cylinder. This lash L1 between the exhaust cam 112 and the exhaust follower 116 is, in some embodiments, between 2.5 millimeters (mm) and 3.5 mm. In some embodiments, the lash L1 is between 2.8 mm and 3.2 mm. In some embodiments, the lash L1 is 2.8 mm. In some embodiments, the lash L1 is 3.2 mm.

Figure 7:
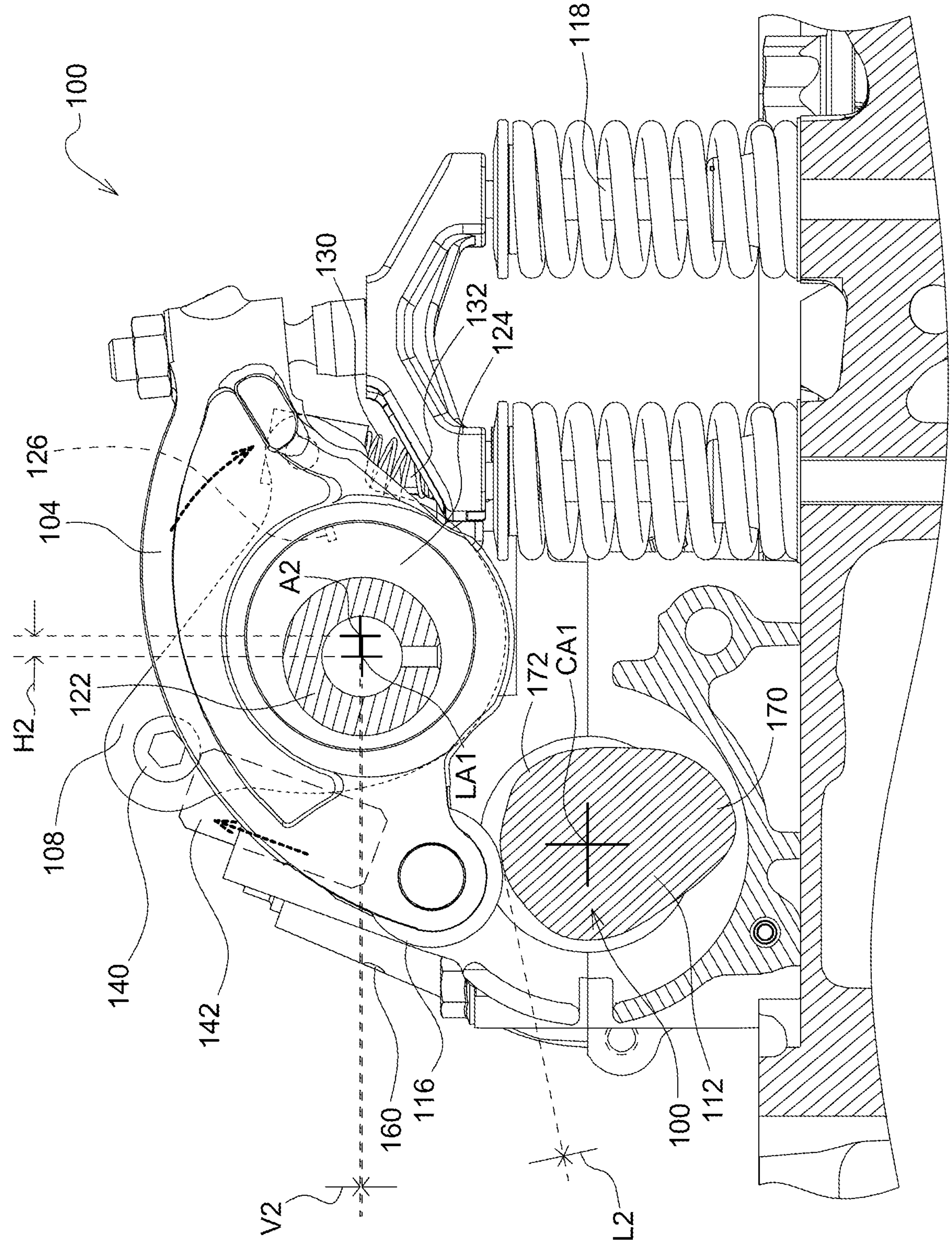
FIG. 7 illustrates a cross-sectional elevation view of the exhaust armature and the cam of the engine braking system of FIG. 1 without a lash spacing between the follower and the cam.

As shown in FIG. 6, the camshaft 102 has a camshaft axis of rotation CA1. The exhaust armature 104 has a first axis of rotation A1 in the power mode. The hydraulic actuation of the piston moves the exhaust armature 104 such that the exhaust armature 104 has a second axis of rotation A2 in the engine brake mode (FIG. 7). The second axis of rotation A2 is in a different location relative to, for instance, the camshaft axis of rotation CA1 compared to the first axis of rotation A1. In the illustrated embodiment, the longitudinal axis LA1 of the mount shaft 122 is in a static location relative to the camshaft axis of rotation CA1. In the power mode (FIG. 6), the axis of rotation A1 of the exhaust armature 104 has a vertical offset V1 from the longitudinal axis LA1 of 2.00 mm and a horizontal offset H1 from the longitudinal axis LA1 of 4.58 mm. In the engine brake mode (FIG. 7), the axis of rotation A2 of the exhaust armature 104 has a vertical offset V2 from the longitudinal axis LA1 of 0.60 mm and a horizontal offset H2 from the longitudinal axis LA1 of 4.96 mm. This change in location of the axis of rotation A1, A2 of the exhaust armature 104 is due to the eccentric bushing 124.

With reference to FIG. 7, the components of the engine 10 and the engine braking system 100 are shown in the engine brake mode. In the engine brake mode, the exhaust follower 116 engages both the primary lobe 170 and the brake bump 172 sequentially. In some embodiments, the exhaust follower 116 engages the outer surface of the exhaust cam 112 throughout the rotation of the exhaust cam 112 in the engine brake mode. This behavior is represented by the solid line only above the dashed line D2 in the line graph showing the kinematic exhaust valve lift in FIG. 8. In the illustrated embodiment, the entirety of the solid line is above the dashed line D2. Due to the hydraulic actuation of the piston 142, the distance between the exhaust follower 116 and the exhaust cam 112 changes to have a new lash distance L2. In some embodiments, the lash distance L2 in the engine brake mode is less than 3.2 mm. In some embodiments, the lash distance L2 in the engine brake mode is less than 2.8 mm. In some embodiments, the lash distance L2 in the engine brake mode is less than 2 mm. In some embodiments, the lash distance L2 in the engine brake mode is less than 1 mm. In some embodiments, the lash distance L2 in the engine brake mode is 0 mm. A balance of forces maintains the exhaust follower 116 in position relative to the exhaust cam 112. These forces include those of the spring 130, the hydraulic pressure on the piston 142, the reaction force from the exhaust cam 112 on the exhaust follower 116, the eccentric force about the mount shaft 122, the springs of each of the exhaust valves 118, the force of compressed air in the cylinder against the exhaust valves 118, and the like. In some embodiments, this balance of forces causes the exhaust follower 116 to automatically adjust to reduce the lash distance between the exhaust follower 116 and the exhaust cam 112 below a threshold lash distance. This automatic adjustment may allow for optimal operation even after significant wear of the exhaust follower 116 and/or the exhaust cam 112. This balance of forces also eliminates the need for reliance on a hard mechanical stop, such as a stop post, and instead allows the lash distance to reach 0 mm. This optimum operational setting allows for the most possible valve lift, which allows for the most possible engine braking power.

The present disclosure also relates to methods of operating an engine braking system 100. The method may include receiving a signal to engage the engine braking system 100, opening a fluid valve (with a solenoid 162, for instance), introducing fluid behind a piston 142, pushing the piston 142 with the fluid, engaging a lever 108 with the piston 142, changing a position of an exhaust armature 104 coupled to the lever 108, and reducing a lash distance L1, L2 between a cam 112 and a follower 116, wherein the follower 116 is coupled to the exhaust armature 104. In some embodiments, the method further includes receiving a signal to disengage the engine braking system 100, releasing the fluid from behind the piston 142, biasing the lever 108 with a spring 130, changing the position of the exhaust armature 104, and increasing the lash distance L1, L2 between the cam 112 and the follower 116.

Of course, features of one embodiment can be combined with features of another embodiment to create yet another embodiment. As such, the present disclosure is capable of many alterations and embodiments, and the specific disclosed embodiments should not be viewed as limiting.

Thus, embodiments described herein provide methods and systems for operating an engine braking system.

What is claimed is:

1. An engine braking system comprising:

a camshaft including a plurality of cams, each cam having a lobe and a brake bump;

a plurality of followers, each follower configured to engage a respective cam of the plurality of cams;

a plurality of exhaust armatures, each exhaust armature coupled to a respective follower of the plurality of followers;

a mount shaft having a longitudinal axis, each exhaust armature rotatably coupled to the mount shaft, the mount shaft being rotationally static about the longitudinal axis;

a plurality of levers, each lever coupled to a respective exhaust armature of the plurality of exhaust armatures; and a plurality of hydraulically actuated pistons, each hydraulically actuated piston configured to move a respective lever of the plurality of levers, wherein actuation of each piston causes a change in lash distance between the respective cam and the respective follower, and in an engine brake mode, a balance of forces causes the respective follower to automatically adjust to reduce the lash distance below a threshold value and thereby contact the respective cam throughout rotation of the respective cam, and fluid remains trapped behind each piston throughout the engine brake mode.

2. The engine braking system of claim 1, wherein, in a power mode, the respective follower engages a respective lobe and does not engage a respective brake bump of the respective cam.

3. The engine braking system of claim 2, wherein, during at least a portion of the power mode, the lash distance between the respective cam and the respective follower is between 2.5 millimeters and 3.5 millimeters.

4. The engine braking system of claim 3, wherein, during at least a portion of the power mode, the lash distance between the respective cam and the respective follower is between 2.8 millimeters and 3.2 millimeters.

5. The engine braking system of claim 2, wherein, during at least a portion of the engine brake mode, the lash distance between the respective cam and the respective follower is 0 millimeters.

6. The engine braking system of claim 1, further comprising a plurality of eccentric bushings, each eccentric bushing statically coupled to the respective exhaust armature and disposed radially between the respective exhaust armature and the mount shaft.

7. The engine braking system of claim 1, wherein the camshaft includes a camshaft axis of rotation, each exhaust armature of the plurality of exhaust armatures includes an armature axis of rotation, and hydraulic actuation of a respective piston causes a respective armature axis of rotation to change location relative the camshaft axis of rotation.

8. The engine braking system of claim 1, further comprising a solenoid configured to selectively release fluid to hydraulically actuate all of the plurality of pistons.

9. The engine braking system of claim 8, wherein the fluid includes engine oil.

10. The engine braking system of claim 8, further comprising a controller operatively coupled with the solenoid, the controller configured to activate the solenoid after detecting whether brake conditions have been met.

11. The engine braking system of claim 10, wherein the brake conditions include engine speed being above a threshold value and cylinder fueling having ceased.

12. The engine braking system of claim 10, wherein the controller is further configured to deactivate the solenoid after detecting the brake conditions are no longer met.

13. The engine braking system of claim 1, further comprising a plurality of springs, each spring biasing the respective lever of the plurality of levers, wherein each hydraulically actuated piston overcomes the spring biasing to move the respective lever.

14. The engine braking system of claim 1, further comprising a plurality of leaf springs, each leaf spring statically mounted to and cantilevered from the mount shaft, each leaf spring configured to engage a portion of the respective exhaust armature.

15. A method of operating an engine braking system, the method comprising:

receiving a signal to engage the engine braking system;

opening a fluid valve in response to the signal;

introducing fluid through the valve to hydraulically move a plurality of pistons;

engaging a lever with each piston of the plurality of pistons due to movement of the respective piston, the lever being one of a plurality of levers, and each lever of the plurality of levers being engageable by the respective piston of the plurality of pistons;

changing a position of an exhaust armature coupled to the lever due to movement of the lever, the exhaust armature being one of a plurality of exhaust armatures, and each exhaust armature of the plurality of exhaust armatures being statically coupled to a respective eccentric bushing, each eccentric bushing at least partially surrounding a common mount shaft, the eccentric bushing being statically coupled to a respective lever of the plurality of levers;

reducing a lash distance between a cam and a follower due to movement of the exhaust armature, the follower coupled to the exhaust armature, the cam being one of a plurality of cams on a camshaft, the follower being one of a plurality of followers corresponding to respective cams of the plurality of cams, and each follower of the plurality of followers being coupled to each exhaust armature of the plurality of exhaust armatures;

contacting the cam with the follower throughout rotation of the cam in an engine brake mode due to a balance of forces causing the follower to automatically adjust to reduce the lash distance below a threshold value; and trapping fluid behind each piston of the plurality of pistons throughout the engine brake mode.

16. The method of claim 15, further comprising receiving a signal to disengage the engine braking system;

releasing the fluid in response to the signal to disengage;
biasing the lever with a spring;
changing the position of the exhaust armature due to releasing the fluid and biasing from the spring; and
increasing the lash distance between the cam and the follower due to movement of the exhaust armature.

17. The method of claim 16, wherein the signal to disengage the engine braking system corresponds with an engine speed falling below a threshold value.

18. The method of claim 15, further comprising confirming an engine speed is above a threshold value and confirming fueling has stopped prior to opening the fluid valve.

* * * * *